(12) United States Patent
Nagao et al.

(10) Patent No.: US 12,391,517 B2
(45) Date of Patent: Aug. 19, 2025

(54) ELEVATOR

(71) Applicant: Hitachi, Ltd., Tokyo (JP)

(72) Inventors: Akira Nagao, Tokyo (JP); Yanming Jin, Tokyo (JP); Takuya Osawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1203 days.

(21) Appl. No.: 17/273,802

(22) PCT Filed: Sep. 6, 2018

(86) PCT No.: PCT/JP2018/033056
§ 371 (c)(1),
(2) Date: Mar. 5, 2021

(87) PCT Pub. No.: WO2020/049689
PCT Pub. Date: Mar. 12, 2020

(65) Prior Publication Data
US 2021/0206599 A1    Jul. 8, 2021

(51) Int. Cl.
*B66B 3/00* (2006.01)
*H04B 5/00* (2024.01)
*H04B 5/24* (2024.01)
*H04R 25/00* (2006.01)

(52) U.S. Cl.
CPC ............... *B66B 3/002* (2013.01); *H04B 5/24* (2024.01); *H04R 25/554* (2013.01); *H04R 25/558* (2013.01); *H04R 2225/51* (2013.01)

(58) Field of Classification Search
CPC ...................................................... B66B 3/00
See application file for complete search history.

(56) References Cited

U.S. PATENT DOCUMENTS

2008/0170713 A1    7/2008  Nagata

FOREIGN PATENT DOCUMENTS

| JP | 11-018228 A    | 1/1999 |
| JP | 2003-219500 A  | 7/2003 |
| JP | 2003-230212 A  | 8/2003 |
| JP | 2006-256843 A  | 9/2006 |
| JP | 2009-044918 A  | 2/2009 |

OTHER PUBLICATIONS

Japanese Office Action received in corresponding Japanese Application No. 2020-540948 dated Mar. 8, 2022.
International Search Report of PCT/JP2018/033056 dated Nov. 6, 2018.

*Primary Examiner* — Ian A Rummel
(74) *Attorney, Agent, or Firm* — MATTINGLY & MALUR, PC (57) ABSTRACT

The elevator includes an amplifier to amplify an acoustic signal; and an induction loop having looped wires that generate a magnetic field by current output from the amplifier, in which plural wire harnesses forming the induction loop are electrically connected to one another by plural connectors, which the respective wire harnesses have, coupled to one another; and the plural wire harnesses include a first wire harness having a first connector which is connected to the connection line to the amplifier, a second connector which is connected to the connection line to the winding start of the induction loop, and a third connector which is connected to the connection line to the winding end of the induction loop, and an elongated second wire harness which forms at least a part of the looped electric wires and has a fourth connector at one end and a fifth connector at another end.

10 Claims, 6 Drawing Sheets

ELEVATOR

TECHNICAL FIELD

The present invention relates to an elevator provided with a hearing aid device.

BACKGROUND ART

In public spaces such as a community hall which are used by many people, a hearing aid system using an induction loop (magnetic loop) is provided for helping them to hear voices.

With the hearing aid system, an acoustic signal current flows through the looped electric wires (induction loop) and a magnetic field according to the acoustic signal is generated. An induction coil is placed within the magnetic field, and voices are reproduced by amplifying the current inducted to the induction coil by the magnetic field.

Discussion is under way for installing a hearing aid system also in an elevator that is utilized by many people, in which there are already some cases standardized for that purpose.

For example, a technique relating to a hearing aid system dedicated to an elevator is known from Patent Literature 1 below.

In this technique, a loop antenna (i.e., induction loop) is provided on an elevator cage (over the floor, ceiling or wall) or elevator stops (in the attic or underfloor). Then, the elevator users hear the voice guidance transmitted from the loop antenna through the hearing aid having a telephone coil (or induction coil).

To note, the induction loop is referred to as various names such as 'a loop antenna', 'a magnetic loop' and 'a hearing loop', but hereinafter called as 'induction loop'.

CITATION LIST

Patent Literature

PTL 1: Japanese Patent Application Laid-Open No. 2006-256843

SUMMARY OF INVENTION

Technical Problem

According to the technique disclosed in Patent Literature 1, an electric wire which is an elongated material is laid in a looped manner in the elevator cage or at elevator stops to dispose the induction loop, which leads to complicating the laying operation and increasing the time required for carrying out such operation.

Thus, the present invention is to provide an elevator provided with a hearing aid system by which the induction loop can be readily laid in place.

Solution to Problem

In order to solve the above problem, the elevator according to the present invention includes: an amplifier to amplify an acoustic signal for transmitting information to an elevator user and output the amplified signal; and an induction loop provided with looped electric wires through which current output from the amplifier flows to generate a magnetic field, in which the induction loop is arranged such that plural wire harnesses are electrically connected to one another, in which the plural wire harnesses are electrically connected to one another by plural connectors with which the respective wire harnesses are provided engaged to one another; and the plural wire harnesses are branched into a first connection line to the amplifier, a second connection line to a winding start of the induction loop, and a third connection line to a winding end of the induction loop; and include a first wire harness of the plural wire harnesses which is provided with a first connector which is electrically connected to the first connection line, a second connector which is electrically connected to the second connection line, and a third connector which is electrically connected to the third connection line; and an elongated second wire harness which forms at least a part of the looped electric wires and is provided at one end with a fourth connector and is provided at another end with a fifth connector.

Advantageous Effects of Invention

According to the present invention, it is possible to readily lay the induction loop in the elevator.

The problems, features and effects other than noted above are clarified according to the description of the following embodiments.

DESCRIPTION OF EMBODIMENTS

Hereafter, the present embodiment is explained according to the following Examples 1 and 2 with reference to the accompanying drawings.

In the respective drawings, what has the same reference sign denotes the same characteristic feature or the feature provided with the similar function to each other.

Example 1

Figure 1:
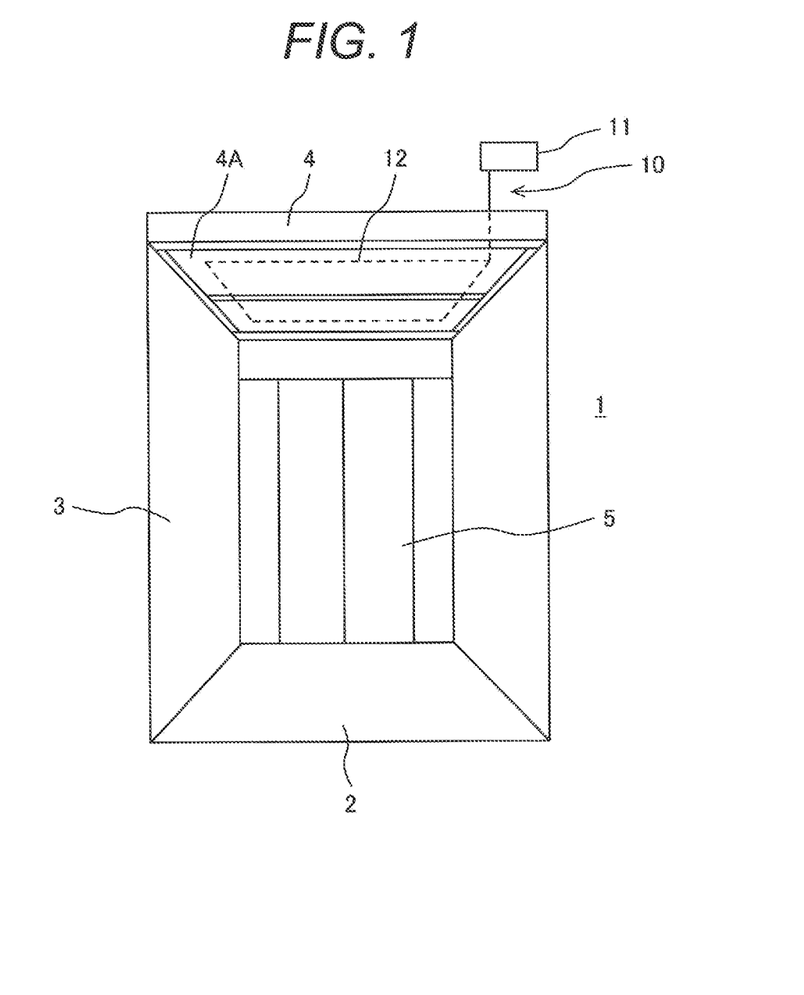
FIG. 1 illustrates a schematic view of the elevator cage according to Example 1.

FIG. 1 illustrates the schematic view of the elevator cage according to Example 1. FIG. 1 is a view showing the cage door seen from the inside of the elevator cage.

As illustrated in FIG. 1, the elevator cage 1 is provided with a floor 2, side plates 3 erected on the peripheral fringes of the floor 2, a ceiling 4 which is provided on the upper portions of the side plates 3 and in which a design panel 4A is arranged on the side of the cage space, and a cage door 5 opposed to the elevator stop.

The elevator cage 1 is driven by a known driving mechanism and ascends/descends through the elevator shaft within a building structure. Further, the cage door 5, upon the elevator cage 1 landing at a floor, engages with a hall door not shown in the drawings so as to be opened/closed along with the hall door by the known driving mechanism which is provided on the elevator cage 1.

A hearing aid system 10 having an induction loop described below is provided on the elevator cage 1. The hearing aid system 10 is provided with a magnetic induction amplifier 11 to amplify a voice signal output by the control unit not shown in the drawings so as to output the amplified voice signal current and the induction loop 12 connected to the output of the magnetic induction amplifier 11. The induction loop 12 is disposed outside of the elevator cage 1, but on the upper side of the ceiling 4 in a looped manner along the peripheral fringes of the ceiling 4, thereby, allowing a magnetic field to be generated within the whole space of the elevator cage 1 and facilitating the installation and maintenance of the induction loop 12.

To note, the magnetic induction amplifier 11 may amplify an acoustic signal to transmit information through an alarm or melody besides a voice signal which is an acoustic signal to transmit information by spoken words such as guidance announcements to an elevator user.

When the voice signal current output from the magnetic induction amplifier 11 flows through the induction loop 12, the magnetic field that changes according to the voice signal is generated within the elevator cage 1. Through such magnetic field, weak current is induced to the induction coil with which the receiver that the elevator user in the elevator cage 1 carries or wears includes. The receiver amplifies such weak current so as to reproduce the voice signal. Thereby, the elevator user can hear the content of the announcement in the elevator cage 1 or the content of the message communicated through an interphone at emergency with e.g., earphones with which the receiver includes.

Next, the arrangement of the induction loop 12 is explained.

Figure 2:
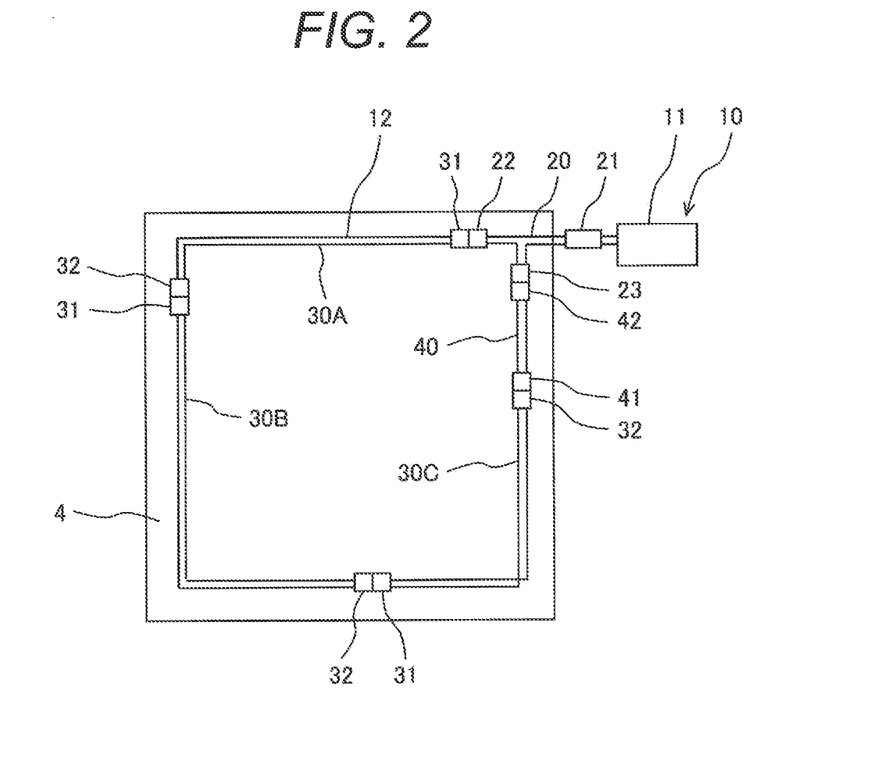
FIG. 2 illustrates the arrangement of the induction loop disposed on the ceiling according to Example 1.

FIG. 2 illustrates the arrangement of the induction loop disposed over the ceiling 4 according to Example 1.

With the induction loop 12, plural wire harnesses (hereinafter, referred to as 'harnesses') including electric wires such as insulation coating lead wires and connectors are connected to one another with such connectors. Thereby, the electric wires form a single loop or multiplex loops (duplex loops according to the illustration of FIG. 2).

As illustrated in FIG. 2, the induction loop 12 includes a branched harness 20 which forms a connection portion to the output of the magnetic induction amplifier 11, the elongated fixed-scale harnesses 30 with a fixed length, and an elongated adjustment harness 40 with a shorter length than that of the elongated fixed-scale harness. To note, in Example 1, there are provided one branched harness 20, three fixed-scale harnesses 30, and one adjustment harness 40.

The branched harness 20 is provided with a first connector 21, a second connector 22, and a third connector 23, in which the first connector 21 is connected to the magnetic induction amplifier 11. Each of those three fixed-scale harnesses 30 (30A, 30B, and 30C) is provided with a fourth connector 31 and a fifth connector 32. The adjustment harness 40 is provided with a sixth connector 41 and a seventh connector 42.

The second connector 22 of the branched harness 20 and the fourth connector 31 of the first fixed-scale harness 30A are detachably coupled to each other for engagement. The fifth connector 32 of the first fixed-scale harness 30A and the fourth connector 31 of the second fixed-scale harness 30B are detachably coupled to each other for engagement. The fifth connector 32 of the second fixed-scale harness 30B and the fourth connector 31 of the third fixed-scale harness 30C are detachably coupled to each other for engagement. The fifth connector 32 of the third fixed-scale harness 30C and the sixth connector 41 of the adjustment harness 40 are detachably coupled to each other for engagement. The seventh connector 42 of the adjustment harness 40 and the third connector 23 of the branched harness 20 are detachably coupled to each other for engagement. The induction loop 12 arranged this way is connected to the magnetic induction amplifier 11 through the first connector 21 of the branched harness 20.

To note, the adjustment harness 40 may be connected between the branched harness 20 and the fixed-scale harness as illustrated in FIG. 2 or may be connected between the neighboring two fixed-scale harnesses 30.

With the induction loop 12 illustrated in FIG. 2, two rounds of the electric wires are wound around the peripheral fringes of the ceiling 4. Thus, as described below, the two electric wires are electrically connected to the respective connectors which the branched harness 20, the fixed-scale harnesses 30, and the adjustment harness 40 have.

To note, the number of the fixed-scale harnesses 30 is not limited to three, but is set according to the largeness of the elevator cage 1 or that of the ceiling 4 where appropriate. Further, when the loop length as required is not satisfied with the single fixed-scale harness 30 or the plural fixed-scale harnesses, the adjustment harness 40 supplements such shortage. Thus, according to the largeness of the ceiling and the number of the fixed-scale harnesses, the length of the adjustment harness 40 is adjusted as needed. To note, when the single fixed-scale harness or the plural ones 30 can satisfy the loop length as required, the adjustment harness 40 may not be used.

Figure 3:
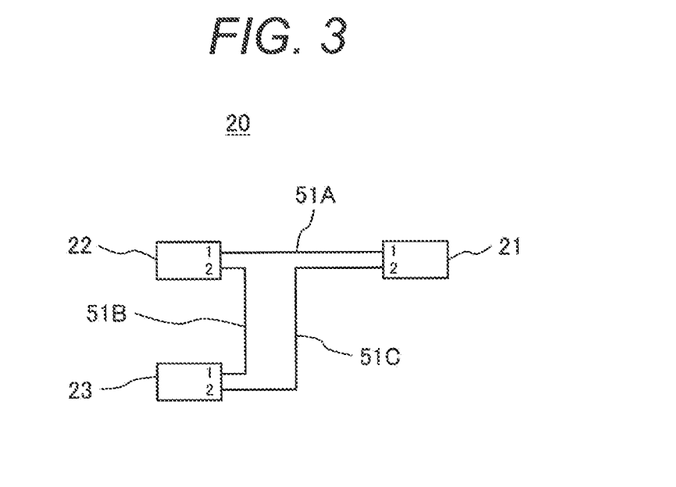
FIG. 3 illustrates the arrangement of the branched harness according to Example 1.

FIG. 3 illustrates the arrangement of the branched harness according to Example 1.

As illustrated in FIG. 3, each of the first connector 21, the second connector 22, and the third connector 23 has a first terminal (1) and a second terminal (2), to each of which terminals one end of one electric wire is electrically and rigidly connected by e.g., soldering or press-fitting. Each of the terminals is constituted of e.g., an electrode pin. To note, the foregoing also applies to the fourth connector 31 and the fifth connector 32 of the fixed-scale harness (see FIG. 4) and the sixth connector 41 and the seventh connector 42 of the adjustment harness (see FIG. 5) which are described below.

One end of the electric wire 51A and one end of the electric wire 51C are connected to the first terminal (1) and the second terminal (2) of the first connector 21 respectively. The other end of the electric wire 51A and one end of the electric wire 51B are connected to the first terminal (1) and the second terminal (2) of the second connector 22 respectively. The other end of the electric wire 51B and the other end of the electric wire 51C are connected to the first terminal (1) and the second terminal (2) of the third connector 23 respectively.

Figure 4:
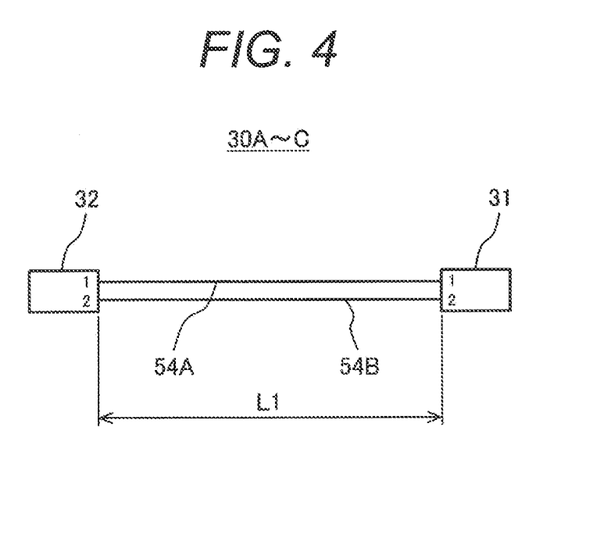
FIG. 4 illustrates the arrangement of the fixed-scale harness according to Example 1.

FIG. 4 illustrates the arrangement of the fixed-scale harness according to Example 1.

As illustrated in FIG. 4, one end of the electric wire 54A and one end of the electric wire 54B are connected to the first terminal (1) and the second terminal (2) of the fourth connector 31 respectively. The other end of the electric wire 54A and the other end of the electric wire 54B are connected to the first terminal (1) and the second terminal (2) of the fifth connector 32 respectively. To note, the length of three fixed-scale harnesses 30A to 30C respectively has the same fixed value L1.

Upon the fourth connector 31 and the second connector 22 being coupled to each other, the first terminal (1) of the fourth connector 31 and the first terminal (1) of the second connector 22 are electrically connected to each other while the second terminal (2) of the fourth connector 31 and the second terminal (2) of the second connector 22 are electrically connected to each other.

Further, upon the fourth connector 31 of one fixed-scale harness and the fifth connector 32 of the other fixed-scale harness being coupled to each other for engagement, the first terminal (1) of the fourth connector 31 and the first terminal (1) of the fifth connector 32 are electrically connected to each other while the second terminal (2) of the fourth connector 31 and the second terminal (2) of the fifth connector 32 are electrically connected to each other.

Figure 5:
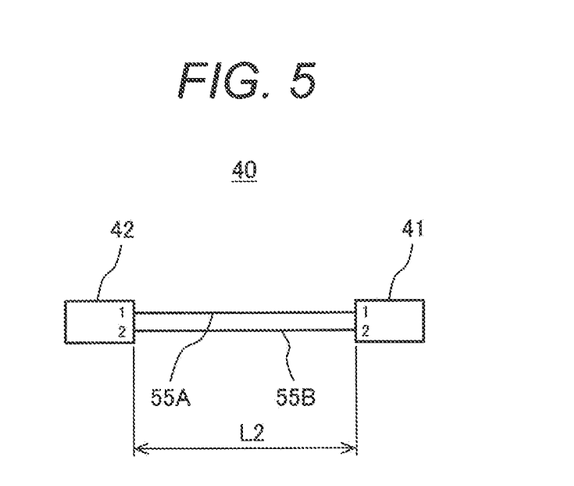
FIG. 5 illustrates the arrangement of the adjustment harness according to Example 1.

FIG. 5 illustrates the arrangement of the adjustment harness according to Example 1.

As illustrated in FIG. 5, one end of the electric wire 55A and one end of the electric wire 55B are connected to the first terminal (1) and the second terminal (2) of the sixth connector 41 respectively. The other end of the electric wire 54A and the other end of the electric wire 55B are connected to the first terminal (1) and the second terminal (2) of the seventh connector 42 respectively. To note, the length or L2 of the adjustment harness is shorter than that or L1 (see FIG. 4) of the fixed-scale harness.

Upon the sixth connector 41 and the fifth connector 32 being coupled to each other for engagement, the first terminal (1) of the sixth connector 41 and the first terminal (1) of the fifth connector 32 are electrically connected to each other while the second terminal (2) of the sixth connector 41 and the second terminal (2) of the fifth connector 32 are electrically connected to each other.

Further, upon the seventh connector 42 and the third connector 23 being coupled to each other for engagement, the first terminal (1) of the seventh connector 42 and the first terminal (1) of the third connector 23 are electrically connected to each other while the second terminal (2) of the seventh connector 42 and the second terminal (2) of the third connector 23 are electrically connected to each other.

Upon the branched harness 20, the fixed-scale harnesses 30A to 30C and the adjustment harness 40 as illustrated in FIGS. 3 to 5 being connected to one another as illustrated in FIG. 2, the electric wires are connected in the following order. That is to say, the electric wire 51A (at the branched harness 20), the electric wire 54A (at the first fixed-scale harness 30A), the electric wire 54A (at the second fixed-scale harness 30B), the electric wire 54A (at the third fixed-scale harness 30C), the electric wire 55A (at the adjustment harness 40), the electric wire 51B (at the branched harness 20), the electric wire 54B (at the first fixed-scale harness 30A), the electric wire 54B (at the second fixed-scale harness 30B), the electric wire 54B (at the third fixed-scale harness 30C), the electric wire 55B (at the adjustment harness 40), and the electric wire 51C (at the branched harness) are connected in this order.

Accordingly, taking the electric wire 51A (at the branched harness 20) as the winding start of the induction loop 12 and as one of the paired connection lines to the magnetic induction amplifier, the first looped round is formed by the electric wires 54A (at the first to third fixed-scale harnesses 30A to 30C) and the electric wire 55A (at the adjustment harness). Further, subsequently to the first looped round, taking the electric wire 51C (at the branched harness 20) as the winding end of the induction loop 12 and as the other of the paired connection lines to the magnetic induction amplifier, the second looped round is formed by the electric wires 54B (at the first to third fixed-scale harnesses 30A to 30C), the electric wire 55B (at the adjustment harness 40), and the electric wire 51C (at the branched harness). Hereupon, the first looped round and the second looped round are electrically connected to each other by the electric wire 51B at the branched harness 20, thereby, the induction loop 12 including the continuous two rounds loop being formed.

The induction loop according to Example 1 is laid as follows.

In the first place, the prefabricated wire harnesses, that is to say, the aforesaid branched harness, the aforesaid fixed-scale harnesses, the required number of which depends on the largeness of the elevator cage's ceiling, and the aforesaid adjustment harness, the required size of which depends on the largeness of the elevator cage's ceiling and the number of the fixed-scale harnesses are transported in the elevator cage's ceiling.

Then, the connectors which such branched harness, fixed-scale harnesses, and adjustment harness have are coupled to each other for engagement in the ceiling.

For instance, the first connector 21 of the branched harness 20 is connected to the magnetic induction amplifier 11. Then, the fourth connector 31 of the first fixed-scale harness 30A is coupled for engagement to the second connector 22 of the branched harness 20. Subsequently, the fourth connector 31 of the second fixed-scale harness 30B is coupled for engagement to the fifth connector 32 of the first fixed-scale harness 30A. Next, the fourth connector 31 of the third fixed-scale harness 30C is coupled for engagement to the fifth connector 32 of the second fixed-scale harness 30B. Thereafter, the sixth connector 41 of the adjustment harness 40 is coupled for engagement to the fifth connector 32 of the third fixed-scale harness 30C while the seventh connector 42 of the adjustment harness 40 is coupled for engagement to the third connector 23 of the branched harness 20.

To note, for one set of connectors engaged to each other as mentioned above, for example, a metal connector (or metal outlet) which forms one set of a plug and a relay adapter to be engaged into the plug is applied. In this case, for example, the fourth connector 31 and the fifth connector 32 of the fixed-scale harnesses (30: 30A, 30B, and 30C) respectively serve as a plug and a relay adapter; the sixth connector 41 and the seventh connector 42 of the adjustment harness 40 serve respectively as a plug and a relay adapter; and the second connector and the third connector of the branched harness 20 serve respectively as a relay adapter and a plug. To note, various types of connectors which are adaptable for the connection with the magnetic induction amplifier may be applied for the first connector of the branched harness 20.

In this way, the electric wires are wound twice around the peripheral fringes of the ceiling 4, thereby, the induction loop of duplex loop type being laid in place.

According to the aforesaid first example, the induction loop 12 is arranged such that the connectors with which each of the plural wire harnesses has are engaged to each other between the two interconnected wire harnesses, thereby, allowing the induction loop 12 to be readily laid over the elevator cage's ceiling upon the hearing aid system being provided in the elevator. Accordingly, it can reduce the time required for the laying work of the induction loop. Further, by prefabricating the wire harnesses before the laying work, it is possible to reduce both the time required for the laying work of the induction loop 12 and the relevant cost.

Further, according to Example 1, by using the branched harness, the fixed-scale harnesses having a fixed length and the adjustment harness whose length is shorter than that of the fixed-scale one, it is possible to set the loop length corresponding to the largeness of various types of elevator cages. For example, adjusting the number of the fixed-scale harnesses and the length of the adjustment harness leads to responding to the ceilings of different sizes, thereby, facilitating the induction loop to be designed on a case-by-case basis.

Moreover, according to Example 1, the first looped round is formed by one of the two electric wires which the fixed-scale harnesses has and one of the two electric wires which the adjustment harness has while the second looped round is formed by the other of the two electric wires which the fixed-scale harnesses has and the other of the two electric wires which the adjustment harness has. In addition, the first and second looped rounds are connected to each other by the electric wire which the branched harness has. Thus, the induction loop of duplex loop type can be readily arranged by the engagement of connectors. Thereby, the intensity of the magnetic field within the elevator cage can be enhanced.

Example 2

Now, the explanation of the elevator according to Example 2 is as follows. To note, the following explanation is focused on differences from Example 1.

According to Example 2, as described below, the number of windings of the induction loop can be set to 2-4 rounds by the branched harness.

Figure 6:
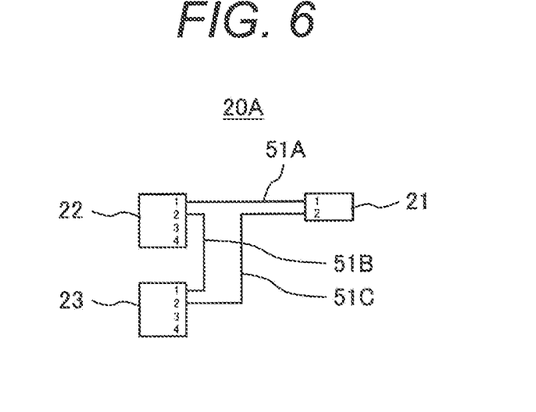
FIG. 6 illustrates the arrangement of the branched harness for the induction loop with two rounds of windings.
Figure 7:
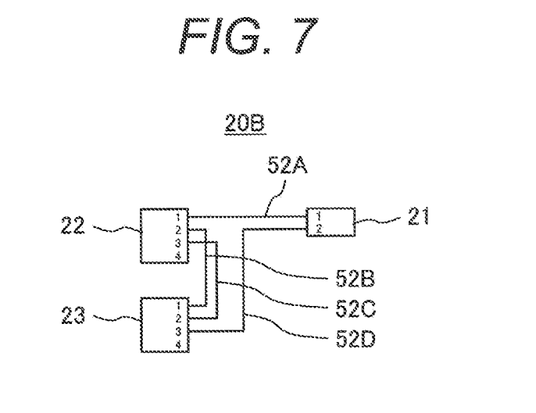
FIG. 7 illustrates the arrangement of the branched harness for the induction loop with three rounds of windings.
Figure 8:
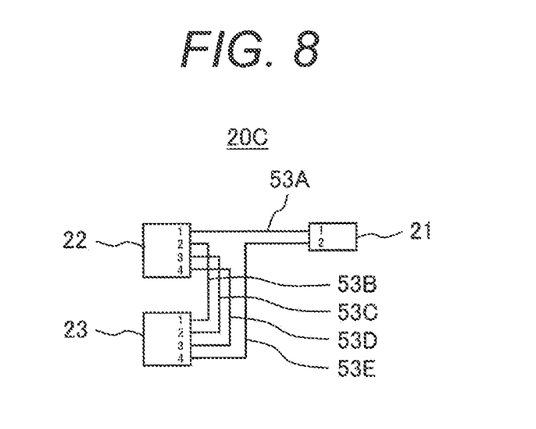
FIG. 8 illustrates the arrangement of the branched harness for the induction loop with four rounds of windings.

FIGS. 6 to 8 illustrate the arrangement of the branched harnesses according to Example 2.

FIG. 6 illustrates the arrangement of the branched harness for the induction loop whose number of windings is two rounds.

As illustrated in FIG. 6, the branched harness 20A has the first connector 21, the second connector 22, and the third connector 23. In the same way as Example 1, the first connector 21 includes the first terminal (1) and the second terminal (2) and is connected to the magnetic induction amplifier.

Each of the second connector 22 and the third connector 23, unlike Example 1, includes the first terminal (1), the second terminal (2), a third terminal (3), and a fourth terminal (4).

One end of the electric wire 51A and one end of the electric wire 51C are connected to the first terminal (1) and the second terminal (2) of the first connector 21 respectively. The other end of the electric wire 51A and one end of the electric wire 51B are connected to the first terminal (1) and the second terminal (2) of the second connector 22 respectively. The other end of the electric wire 51B and the other end of the electric wire 51C are connected to the first terminal (1) and the second terminal (2) of the third connector 23 respectively. No electric wire is connected to the third terminals (3) and the fourth terminals (4) of the second connector 22 and the third connector 23, so that such terminals are unused.

To note, in the same way as Example 1, the first looped round and the second looped round are electrically connected to each other by the electric wire 51B at the branched harness 20A. Further, the electric wires 51A and 51C at the branched harness 20A result in the connection lines between the induction loop and the magnetic induction amplifier.

FIG. 7 illustrates the arrangement of the branched harness for the induction loop whose number of windings is three rounds.

As illustrated in FIG. 7, the branched harness 20B, in the same way as the branched harness 20A illustrated in FIG. 6, has the first connector 21, the second connector 22, and the third connector 23. The first connector 21 includes the first terminal (1) and the second terminal (2) and is connected to the magnetic induction amplifier. Each of the second connector 22 and the third connector 23 includes the first terminal (1), the second terminal (2), the third terminal (3), and the fourth terminal (4).

One end of the electric wire 52A and one end of the electric wire 52D are connected to the first terminal (1) and the second terminal (2) of the first connector 21 respectively. The other end of the electric wire 52A, one end of the electric wire 52B, and one end of the electric wire 52C are connected to the first terminal (1), the second terminal (2), and the third terminal (3) of the second connector 22 respectively. The other end of the electric wire 52B, the other end of the electric wire 52C, and the other end of the electric wire 52D are connected to the first terminal (1), the second terminal (2), and the third terminal (3) of the third connector 23 respectively. No electric wire is connected to the fourth terminal (4) of the second connector 22 and the third connector 23 respectively, so that such terminals are being unused.

The first looped round and the second looped round are electrically connected to each other by the electric wire 52B at the branched harness 20B. The second looped round and the third looped round are electrically connected by the electric wire 52C. Further, the electric wires 52A and 52D at the branched harness 20B result in the connection lines between the induction loop and the magnetic induction amplifier.

FIG. 8 illustrates the arrangement of the branched harness for the induction loop whose number of windings is four rounds.

As illustrated in FIG. 8, the branched harness 20C, in the same way as the branched harnesses 20A and 20B illustrated in FIGS. 6 and 7, has the first connector 21, the second connector 22, and the third connector 23. The first connector 21 includes the first terminal (1) and the second terminal (2) and is connected to the magnetic induction amplifier. Each of the second connector 22 and the third connector 23 has the first terminal (1), the second terminal (2), the third terminal (3), and the fourth terminal (4).

One end of the electric wire 53A and one end of the electric wire 53E are connected to the first terminal (1) and the second terminal (2) of the first connector 21 respectively. The other end of the electric wire 53A, one end of the electric wire 53B, one end of the electric wire 53C, and one end of the electric wire 53D are connected to the first terminal (1), the second terminal (2), the third terminal (3), and the fourth terminal (4) of the second connector 22 respectively. The other end of the electric wire 53B, the other end of the electric wire 53C, the other end of the electric wire 53D, and the other end of the electric wire 53E are connected to the first terminal (1), the second terminal (2), the third terminal (3), and the fourth terminal (4) of the third connector 23 respectively.

The first looped round and the second looped round are electrically connected to each other by the electric wire 53B at the branched harness 20C. The second looped round and the third looped round are electrically connected to each other by the electric wire 53C. The third looped round and the fourth looped round are electrically connected to each other by the electric wire 53D. In addition, the electric wires 53A and 53E result in the connection lines between the induction loop and the magnetic induction amplifier.

Figure 9:
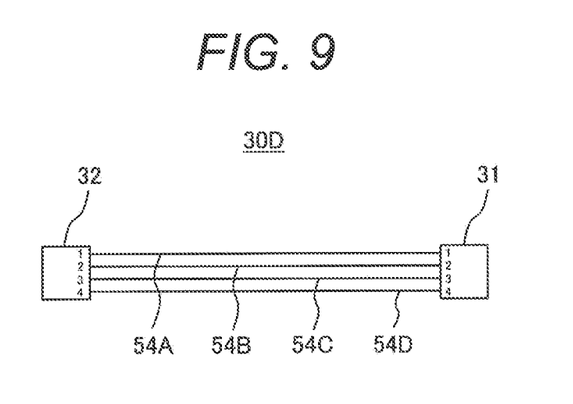
FIG. 9 illustrates the arrangement of the fixed-scale harness according to Example 2.

FIG. 9 illustrates the arrangement of the fixed-scale harness according to Example 2.

As illustrated in FIG. 9, the fixed-scale harness 30D has the fourth connector 31 and the fifth connector 32. Each of the fourth connector 31 and the fifth connector 32 includes the first terminal (1), the second terminal (2), the third terminal (3), and the fourth terminal (4).

The fixed-scale harness 30D is applied to the cases where there are 2-4 rounds of windings for the induction loop in common.

One end of the electric wire 54A, one end of the electric wire 54B, one end of the electric wire 54C, and one end of the electric wire 54D are connected to the first terminal (1), the second terminal (2), the third terminal (3), and the fourth terminal (4) of the fourth connector 31 respectively. The other end of the electric wire 54A, the other end of the electric wire 54B, the other end of the electric wire 54C, and the other end of the electric wire 54D are connected to the first terminal (1), the second terminal (2), the third terminal (4), and the fourth terminal (4) of the fifth connector 32 respectively.

The electric wires 54A, 54B, 54C, and 54D respectively form at least a part of the first looped round, the second looped round, the third looped round, and the fourth looped round for the induction loop. To note, when the number of windings for the induction loop is two rounds, the electric wires 54C and 54D are in their floating conditions due to being not electrically connected to the electric wire at the branched harness 20A even when the second connector 22 (see FIG. 6) of the branched harness 20A and the fourth connector 31 of the fixed-scale harness 30D are engaged to each other. Further, when the number of windings for the induction loop is three rounds, the electric wire 54D is in its floating condition due to being not electrically connected to the electric wire at the branched harness 20B even when the second connector 22 (see FIG. 7) of the branched harness 20B and the fourth connector 31 of the fixed-scale harness 30D are engaged to each other.

Figure 10:
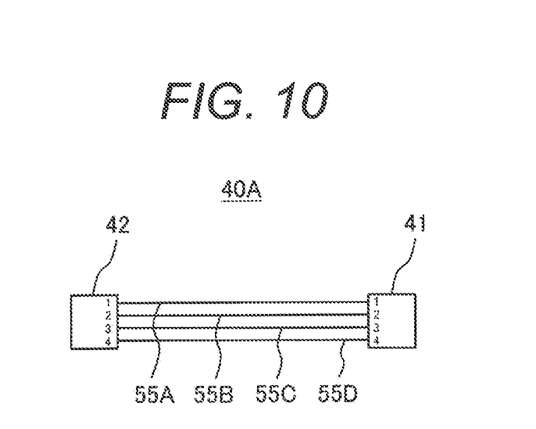
FIG. 10 illustrates the arrangement of the adjustment harness according to Example 2.

FIG. 10 illustrates the arrangement of the adjustment harness according to Example 2.

As illustrated in FIG. 10, the adjustment harness 40A has the sixth connector 41 and the seventh connector 42. Each of the sixth connector 41 and the seventh connector 42 includes the first terminal (1), the second terminal (2), the third terminal (3), and the fourth terminal (4).

The adjustment harness 40A is applied along with the fixed-scale harness 30D (see FIG. 9) to the cases where there are 2-4 rounds of windings for the induction loop in common. To note, the length of the adjustment harness 40A is shorter than that of the fixed-scale harness 30D.

One end of the electric wire 55A, one end of the electric wire 55B, one end of the electric wire 55C, and one end of the electric wire 55D are connected to the first terminal (1), the second terminal (2), the third terminal (3), and the fourth terminal (4) of the sixth connector 41 respectively. The other end of the electric wire 55A, the other end of the electric wire 55B, the other end of the electric wire 55C, and the other end of the electric wire 55D are connected to the first terminal (1), the second terminal (2), the third terminal (3), and the fourth terminal (4) of the seventh connector 42 respectively.

The electric wires 55A, 55B, 55C, and 55D respectively form at least a part of the first looped round, the second looped round, the third looped round, and the fourth looped round for the induction loop. To note, when the number of windings for the induction loop is two rounds, the electric wires 55C and 55D are in their floating condition due to being not electrically connected to the electric wire at the branched harness 20A even when the third connector 23 (see FIG. 6) of the branched harness 20A and the seventh connector 42 of the adjustment harness 40A are engaged to each other. In addition, when the number of windings for the induction loop is three rounds, the electric wire 55D is in its floating condition due to being not electrically connected to the electric wire at the branched harness 20B even when the second connector 22 (see FIG. 7) of the branched harness 20B and the seventh connector 42 of the adjustment harness 40A are engaged to each other.

Figure 11:
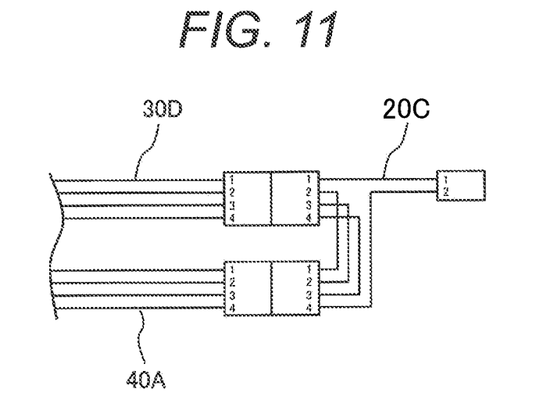
FIG. 11 illustrates the state where the respective harnesses are connected to one another in the case of the induction loop having four rounds of windings.

FIG. 11 illustrates the connection condition of each harness when the number of windings for the induction loop is four rounds.

With reference to the illustration of FIG. 11, upon the connector for the branched harness 20C and the connector for the fixed-scale harness 30D being engaged to each other, the first terminal (1), the second terminal (2), the third terminal (3) and the fourth terminal (4) of the branched harness 20C are respectively connected to the first terminal (1), the second terminal (2), the third terminal (3), and the fourth terminal (4) of the connector for the fixed-scale harness 30D. Thereby, the electric wire connected to each terminal of the connector for the branched harness 20C and the electric wire connected to each terminal of the connector for the fixed-scale harness 30D are electrically connected to each other.

Moreover, upon the connector for the branched harness 20C and the connector for the adjustment harness 40A being engaged to each other, the first terminal (1), the second terminal (2), the third terminal (3), and the fourth terminal (4) of the connector for the branched harness 20C are respectively connected to the first terminal (1), the second terminal (2), the third terminal (3), and the fourth terminal (4) of the connector for the adjustment harness 40A. Thereby, the electric wire connected to each terminal of the connector for the branched harness 20C and the electric wire connected to each terminal of the connector for the adjustment harness 40A are electrically connected to each other.

To note, though not shown in the drawings, upon the connector for one fixed-scale harness 30D and the connector for the other fixed-scale harness 30D being engaged to each other, the first terminal (1), the second terminal (2), the third terminal (3), and the fourth terminal (4) of the connector for the one fixed-scale harness 30D are respectively connected to the first terminal (1), the second terminal (2), the third terminal (3), and the fourth terminal (4) of the connector for the other fixed-scale harness 30D. Thereby, the electric wire connected to each terminal of the connector for the one fixed-scale harness 30D and the electric wire connected to each terminal of the connector for the other fixed-scale harness 30D are electrically connected to each other.

Though not shown in the drawings either, upon the connector for the fixed-scale harness 30D and the connector for the adjustment harness 40A being engaged to each other, the first terminal (1), the second terminal (2), the third terminal (3) and the fourth terminal (4) of the fixed-scale harness 30D are respectively connected to the first terminal (1), the second terminal (2), the third terminal (3), and the fourth terminal (4) of the adjustment harness 40A. Thereby, the electric wire connected to each terminal of the connector for the fixed-scale harness 30D and the electric wire connected to each terminal of the connector for the adjustment harness 40A are electrically connected to each other.

In this way, though not shown in the drawings, the four looped rounds are formed by the fixed-scale harness 30D and the adjustment harness 40A. Further, the four looped rounds are electrically connected to one another by the electric wire of the branched harness 20C. Thereby, the induction loop including the continuous four looped rounds is formed.

Figure 12:
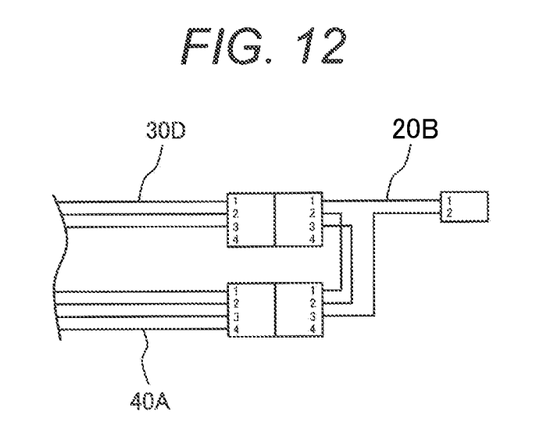
FIG. 12 illustrates the state where the respective harnesses are connected to one another in the case of the induction loop having three rounds of windings.

FIG. 12 illustrates the connection condition of each harness when the number of windings for the induction loop is three rounds.

With reference to the illustration of FIG. 12, upon the connector for the branched harness 20B and the connector for the fixed-scale harness 30D being engaged to each other, the first terminal (1), the second terminal (2), the third terminal (3) and the fourth terminal (4) of the branched harness 20B are respectively connected to the first terminal (1), the second terminal (2), the third terminal (3), and the fourth terminal (4) of the fixed-scale harness 30D. Thereby, the electric wires connected to the first terminal (1), the second terminal (2), and the third terminal (3) of the connector for the branched harness 20B are electrically connected to those connected to the first terminal (1), the second terminal (2), and the third terminal (3) of the connector for the fixed-scale harness 30D respectively. To note, since any electric wire is not connected to the fourth terminal (4) of the connector for the branched harness 20B, the electric wire connected to the fourth terminal (4) of the connector for the fixed-scale harness 30D is not electrically connected to the electric wire at the branched harness 20B.

Further, upon the connector for the branched harness 20B and the connector for the adjustment harness 40A being engaged to each other, the first terminal (1), the second terminal (2), the third terminal (3), and the fourth terminal (4) of the connector for the branched harness 20B are respectively connected to the first terminal (1), the second terminal (2), the third terminal (3), and the fourth terminal (4) of the connector for the adjustment harness 40A. Thereby, the electric wires connected to the first terminal (1), the second terminal (2), and the third terminal (3) of the connector for the branched harness 20B are electrically connected to those connected to the first terminal (1), the second terminal (2), and the third terminal (3) of the connector for the adjustment harness 40A respectively. To note, since any electric wire is not connected to the fourth terminal (4) of the connector for the branched harness 20B, the electric wire connected to the fourth terminal (4) of the connector for the adjustment harness 40A is not electrically connected to the electric wire at the branched harness 20B.

Though not shown in the drawings, upon the connector for one fixed-scale harness 30D and the connector for the other fixed-scale harness 30D being engaged to each other, in the same way as illustrated in FIG. 11, the electric wire connected to each terminal of the connector for the one fixed-scale harness 30D is electrically connected to that connected to each terminal of the connector for the other fixed-scale harness 30D. Further, upon the connector for the fixed-scale harness 30D and the connector for the adjustment harness 40A being engaged to each other, in the same way as illustrated in FIG. 11, the electric wire connected to each terminal of the connector for the fixed-scale harness 30D is electrically connected to that connected to each terminal of the connector for the adjustment harness 40A.

In this way, though not shown in the drawings, the four looped rounds are formed by the fixed-scale harness 30D and the adjustment harness 40A. In addition, the three looped rounds among the four looped rounds are electrically connected to one another by the electric wire of the branched harness 20C, thereby, the induction loop including the continuous three looped rounds being formed.

The induction loop according to Example 2, in the same way as Example 1, is laid over the elevator cage. Further, according to Example 2, the intensity of the magnetic field generated by the induction loop can be adjusted.

For instance, using the branched harness 20B, the fixed-scale harness 30D, and the adjustment harness 40A, the induction loop whose number of windings is three rounds is laid in place. After the induction loop has been laid in place, when it is found that the voices output from the receiving device (e.g. a hearing aid in which an induction coil is integrated) which an elevator user in the elevator cage carries are loops not very audible due to the intensity of the magnetic field generated by the induction loop being insufficient, the branched harness 20B is replaced with the branched harness 20C with the fixed-scale harness 30D and the adjustment harness 40A being not changed. Thereby, the number of windings for the induction loop can be increased to four rounds so as to be able to enhance the intensity of the magnetic field generated by the induction loop.

According to Example 2 explained above, in the same way as Example 1, the induction loop 12 is formed by the connectors, which each of the plural wire harnesses has, coupled to each other, thereby, allowing the induction loop to be readily laid over the elevator cage's ceiling. In addition, in the same way as Example 1, it can respond to the ceilings of different sizes, thereby, facilitating the induction loop to be designed on a case-by-case basis.

Further, according to Example 2, the induction loop having the desired number of windings is formed by arranging four looped rounds with the fixed-scale harness and the adjustment harness respectively having four electric wires, and the desired number of looped rounds among the four looped rounds are electrically connected to one another by the branched harness (20A to 20C), thereby, allowing the magnetic field generated by the induction loop to be adjusted so as to be able to obtain the intensity of the magnetic field with which an elevator user can hear the voice guidance in a reliable manner.

Further, according to Example 2, by preparing the branched harnesses for the induction loop whose number of windings is from two to four rounds, the intensity of the magnetic field can be adjusted by replacing only the branched harness with another with the fixed-scale harness and the adjustment harness being not changed upon the induction loop being laid over or after it has been laid in place.

It should be noted that the present invention is not limited to the above-described embodiments, but includes various modifications. For example, the above embodiments are just intended for explaining the present invention sufficiently enough for the persons skilled in the art to understand it, so that the present invention is not necessarily limited to what covers all the features presented herein. Further, another features may be added to and replaced with some features of each embodiment, and some features of each embodiment may be eliminated.

For instance, the induction loop may be installed on the backside of the design side on the side plates of the elevator cage or in the underfloor of the cage or the elevator stops, in which cases as well, the size of the induction loop and its number of windings can be readily set according to the largeness of the elevator cage or the space of the elevator stops.

Further, the number of electric wires for the fixed-scale harness and the adjustment harness is not limited to two or four, but may be arbitrarily set.

REFERENCE SIGNS LIST

1: Elevator Cage
2: Floor
3: Side Plate
4: Ceiling
4A: Design Panel
5: Cage Door
10: Hearing Aid System
11: Magnetic Induction Amplifier
12: Induction Loop
20, 20A, 20B, 20C: Branched Harness
21, 22, 23: Connector
30, 30A, 30B, 30C, 30D: Fixed-Scale Harness
31, 32: Connector
40, 40A: Adjustment Harness
41, 42: Connector
51A, 51B, 51C: Electric Wire
52A, 52B, 52C, 52D: Electric Wire
53A, 53B, 53C, 53D, 53E: Electric Wire
54A, 54B, 54C, 54D: Electric Wire
55A, 55B, 55C, 55D: Electric Wire

The invention claimed is:

1. An elevator comprising:
an amplifier to amplify an acoustic signal for transmitting information to an elevator user and output the amplified signal; and
an induction loop provided with looped electric wires through which current output from the amplifier flows to generate a magnetic field,
wherein the induction loop is arranged such that a plurality of wire harnesses are electrically connected to one another;
the plurality of wire harnesses are electrically connected to one another by a plurality of connectors, which the respective wire harnesses have, coupled to one another; and
the plurality of wire harnesses includes:
a first wire harness branched into a first connection line to the amplifier, a second connection line to a winding start of the induction loop, and a third connection line to a winding end of the induction loop and having a first connector which is electrically connected to the first connection line, a second connector which is electrically connected to the second connection line, and a third connector which is electrically connected to the third connection line; and
an elongated second wire harness which forms at least a part of the looped electric wires and has a fourth connector at one end and a fifth connector at another end.

2. The elevator according to claim 1, wherein the plurality of wire harnesses include a plurality of the second wire harnesses.

3. The elevator according to claim 2, wherein the plurality of wire harnesses include an elongated third wire harness which forms at least a part of the looped electric wires, having a sixth connector at one end and a seventh connector at another end, and a length of the third wire harness is shorter than that of the second wire harness.

4. The elevator according to claim 3,
wherein the fourth connector of the second wire harness having the winding start among the plurality of second wire harnesses is connected to the second connector of the first wire harness;
the fourth connector and the fifth connector, which one and the other of the two second wire harnesses electrically connected to each other among the plurality of second wire harnesses have respectively, are coupled to each other; and
the third wire harness has the winding end; the sixth connector at the third wire harness coupled to the fifth connector of one of the second wire harnesses among the plurality of second wire harnesses; and the seventh connector at the third wire harness is coupled to the third connector of the first wire harness.

5. The elevator according to claim 1,
wherein the second wire harness forms at least a part of each looped round of the looped electric wires with a plurality of looped rounds; and
the looped electric wires with the plurality of looped rounds are electrically connected to one another by the first wire harness.

6. The elevator according to claim 5,
wherein each of the second connector and the third connector at the first wire harness has a plurality of terminals;
the winding start is electrically connected to one of the plurality of terminals at the second connector;
the winding end is electrically connected to one of the plurality of terminals at the third connector; and
the looped electric wires with the plurality of looped rounds are electrically connected to one another by the electric wires at the first wire harness, the number of which is equal to the number of loops of the looped electric wires and which are connected between the terminals, the number of which is equal to the number of the loops of the looped electric wires, among the plurality of terminals at the second connector and the terminals, the number of which is equal to the number of the loops of the looped electric wires, among the plurality of terminals at the third connector.

7. The elevator according to claim 1,
wherein the second wire harness forms at least a part of each looped round of the looped electric wires with a plurality of looped rounds; and
intensity of the magnetic field is adjusted by the looped electric wires, the number of which is arbitral, among the looped electric wires with the plurality of looped rounds being electrically connected to one another by the first wire harness.

8. The elevator according to claim 7,
wherein each of the second connector and the third connector at the first wire harness has a plurality of terminals;
the winding start is electrically connected to one of the plurality of terminals at the second connector;
the winding end is electrically connected to one of the plurality of terminals at the third connector; and
the looped electric wires are electrically connected to one another, the number of which is arbitral and the same as or smaller than the number of loops of the looped wires, among the looped electric wires with the plurality of looped rounds by the electric wires at the first wire harness, the number of which is arbitral and the same as or smaller than the number of the loops of the looped wires and which are connected between the terminals, the number of which is arbitral and the same as or smaller than the number of the loops of the looped wires, among the plurality of terminals at the second connector and the terminals, the number of which is arbitral and the same as or smaller than the number of the loops, among the plurality of terminals at the third connector.

9. The elevator according to claim 5,
wherein each of the second connector and the third connector at the first wire harness has a plurality of terminals;
the winding start is electrically connected to one of the plurality of terminals at the second connector;
the winding end is electrically connected to one of the plurality of terminals at the third connector; and
the looped electric wires are electrically connected to one another, the number of which is smaller than the number of loops of the looped wires, among the looped electric wires with the plurality of looped rounds by the electric wires at the first wire harness, the number of which is smaller than the number of the loops and which are connected between the terminals, the number of which is smaller than the number of the loops, among the plurality of terminals at the second connector and the terminals, the number of which is smaller than the number of the loops, among the plurality of terminals at the third connector.

10. The elevator according to claim 1, wherein the induction loop is installed over a ceiling of an elevator cage.

* * * * *